UNITED STATES PATENT OFFICE.

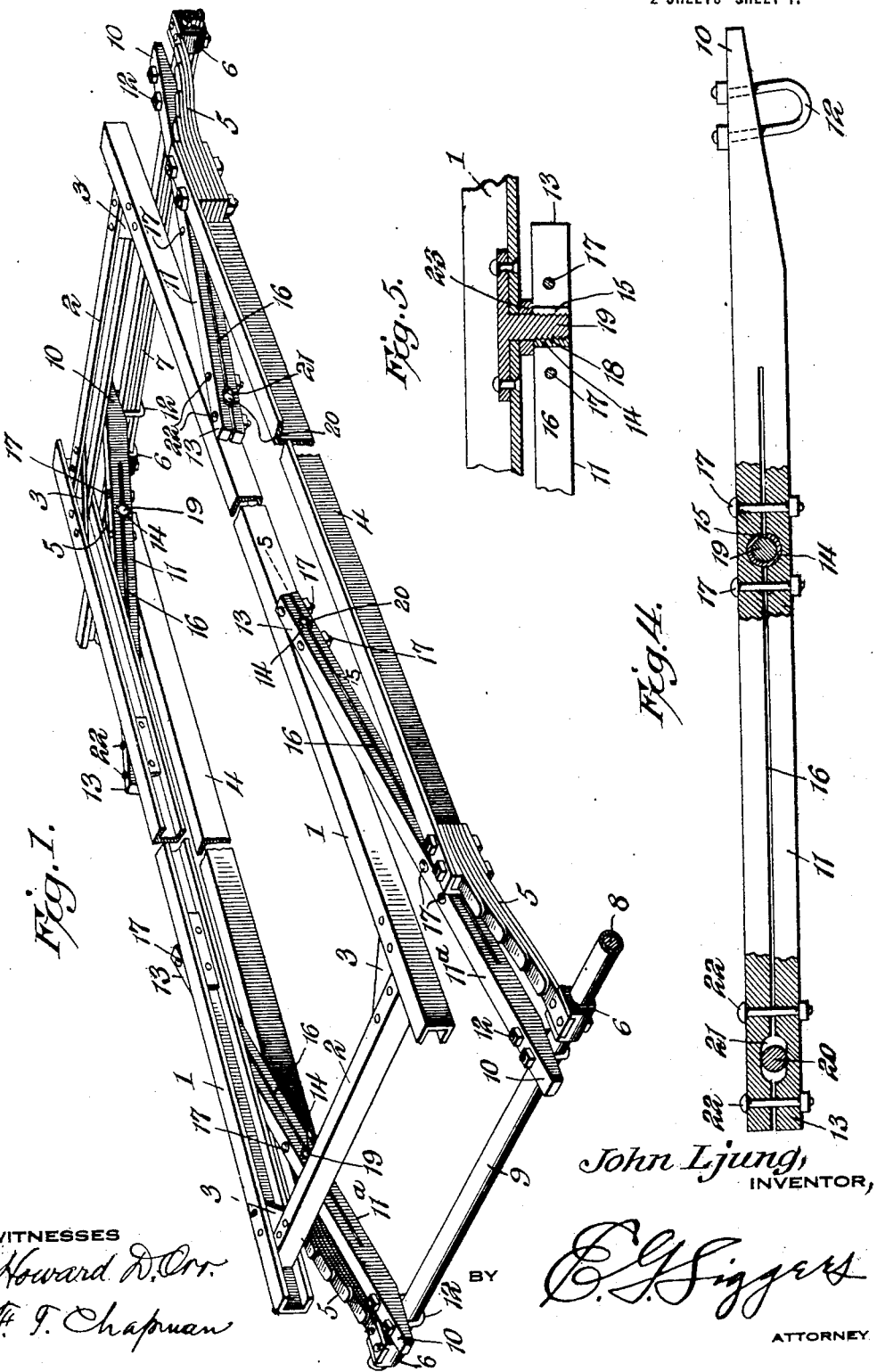

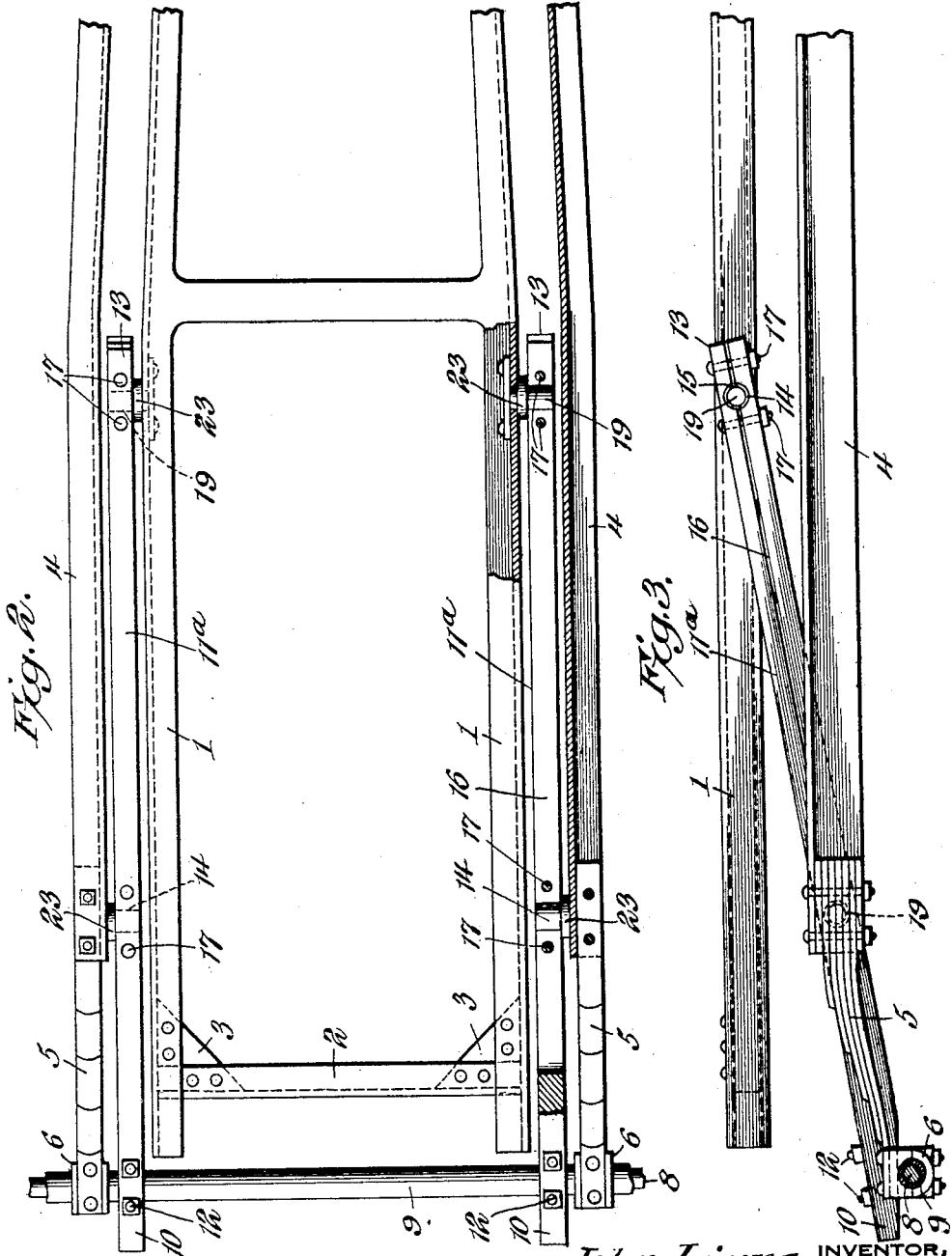

JOHN LJUNG, OF ALEXANDRIA, MINNESOTA.

SPRING SUSPENSION FOR VEHICLES.

1,398,104. Specification of Letters Patent. Patented Nov. 22, 1921.

Application filed November 24, 1920. Serial No. 426,183.

*To all whom it may concern:*

Be it known that I, JOHN LJUNG, a citizen of the United States, residing at Alexandria, in the county of Douglas and State of Minnesota, have invented a new and useful Spring Suspension for Vehicles, of which the following is a specification.

This invention has reference to a spring suspension for vehicles, and while adapted for various types of vehicles, is intended more particularly for suspending the body of an automobile upon the chassis. The object of the invention is to provide an especially easy suspension of sufficient rigidity for the purpose and of a nature which will absorb road shocks and prevent their transmission to the automobile body.

In accordance with the invention, there is provided a body frame which in itself may be of ordinary construction, say, of structural steel of channel form, and there is also provided a chassis of structural steel of angle or channel form connected to the axles of the vehicle by springs of any approved character. The axles are connected to respective end portions of the chassis by means of rock levers in turn pivoted to the chassis frame so that there is an elastic cantaliver junction between the body frame and the chassis frame with the latter mounted on the axles.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawings:

Figure 1 is a perspective view of a spring suspension for vehicles, embodying the invention.

Fig. 2 is a plan view of one end of the structure shown in Fig. 1, with some parts in section.

Fig. 3 is a side elevation of the structure shown in Fig. 2 with some parts in section.

Fig. 4 is a side elevation, in part in longitudinal section, of a rock lever forming part of the invention.

Fig. 5 is a detail section on the line 5—5 of Fig. 1.

Referring to the drawings, there is shown a body frame comprising side bars 1, which may be made of channel steel, and cross bars 2, 2, which may also be made of channel steel, the cross bars constituting end bars and where the side and end bars join they are connected by angle corner pieces 3. It will be understood that the body frame may be otherwise constructed.

There are also provided longitudinal members 4, which may be of angle steel or of other suitable construction, each bar 4 having secured thereto at each end one end of a steel spring 5 of appropriate construction. Each spring 5 is connected at one end, indicated as the large end, to the corresponding end of a side bar or beam 4, and at the other end, indicated as the small end of the spring, the latter is secured to a clip block 6, which in turn is mounted on a front axle 7 or upon the rear axle 8 shown as inclosed in a tube 9 embraced by the clips 6. The rear axle may be assumed to follow the usual construction, which however, is not shown in detail as it forms no part of the present invention.

Engaging the axle 7 or the tube or sheathing 9, is one end 10 of each of four rock levers, comprising two front levers 11 and two rear levers 11ª, shown as of the first order, and located between the adjacent sides of each side bar or beam 1 of the body frame and the corresponding side bar or beam 4 of the chassis frame, these side bars being sufficiently separated to permit the levers 11 and 11ª to be lodged between them for free rocking of the levers 11 and 11ª. The end 10 of each lever 11 and 11ª is connected to the respective axles 7 and 8 by clips 12, indicated in the drawings as of a standard form of U-bolt. The other end 13 of each lever 11 carries a transverse bushing 14, split along one side as indicated at 15, while each lever 11 has a longitudinal slit 16 matching the split 15 in the continuity of the bushing 14. Bolts 17 on opposite sides of the bushing 14, serve to secure the bushing in place in the lever 11. By internally threading the bushing, as indicated at 18, each bushing 14 may be made to snugly grasp and hold a respective stud 19 or 20, as the case may be.

Near one end of each lever 11, there is a longitudinally extended slot 21 interposed in the slit 16, and designed to be traversed by the stud 20, the slit 16 permitting the use of bolts 22, for contracting the slot to snugly yet freely fit the stud 20.

In order to prevent undue wear between each lever 11, and the respective faces of the bars or beams 1 and 4, washers 23 are interposed, being carried by the respective studs 19 and 20.

It is to be assumed that the axles 7 and 8 carry the usual wheels and the side bars 1 of the body frame have the usual body mounted thereon. The parts are so proportioned that with the customary load, the body is depressed to a certain extent thereby rocking the levers 11 about the axes of the axles 7 and 8, depressing the body frames more or less and putting the springs 5 under appropriate tension.

When the vehicle is traveling along a roadway, and an obstruction is met by the vehicle wheels, the tendency of the obstruction is to raise the wheels and axles and with them the springs 5 and the levers 11 and 11ª on the axle ends of the latter. The rising movements of the axles are transmitted through the corresponding ends of the levers 11 and 11ª to the studs 19 and 20, and these movements tend to rock the levers 11 and 11ª depressing the body frame through the studs 19 and reacting through the stud 20 upon the chassis frame so that the shock movement caused by the obstruction is distributed through and absorbed by the springs 5, beams 4, and the body frame made up of the members 1 and 2, whereby the body frame receives substantially no shock at all from the obstruction, but the shock is absorbed by the levers 11 and 11ª and springs 5.

The absorption of the shock is so complete that at a vehicle speed of, say, 20 miles per hour, a glass, or other container, of water, is so little disturbed that there is no spilling of the water, as has been demonstrated in actual practice.

The result is that even on rough roads, the body remains substantially level with a practically complete absorption or elimination of shocks, received from the roadway before reaching the body. Nor is there any rebound and consequently, the riding of the vehicle is particularly gentle and easy, and the resistance of the parts to bending or breaking, or to crystallization, is substantially annihilated.

In the practical embodiment of the invention, the beams or bars 1 and 4, and the end bars 2, may be made of structural steel and the levers 11 may likewise be made of structural material or of wood, structural metal however, being preferred. The springs 5 may follow any appropriate spring construction, either similar to the showing of the drawings, or may be made in any suitable manner.

The levers 11 and 11ª in the relative up-and-down movements of the body frame and chassis have a certain changing relation lengthwise of the levers with respect to the chassis, and consequently the pins 20 have a changing relation with the chassis frame so that this changing relation is compensated for by the elongated slots 21 in the levers 11.

What is claimed is:

1. In a spring suspension for vehicles, a body frame for receiving and sustaining a vehicle body, a chassis for carrying the vehicle axles, and provided with springs between the axles and chassis, and levers each connected at one end to a respective axle and at the other end to the body frame between the extremities of the body frame and the transverse mid-line thereof, and pivot connections between an intermediate point of each lever and the extremities of the chassis adjacent to the junction of the chassis and springs.

2. In a spring suspension for vehicles, a body frame, a chassis frame including springs between the chassis frame and the axles of the vehicle, and levers of the first order located between the chassis frame and the body frame and movable substantially parallel with both frames, the outer end of each lever being connected to a respective axle and the inner end of each lever being connected to the body frame at a point intermediate of the length of the latter.

3. In a spring suspension for vehicles, a frame for receiving and sustaining the vehicle body, a chassis frame exterior to the body frame, springs between the ends of the chassis frame and the axles of the vehicle, levers connecting the axles and the body frame together, and fulcrum connections between the levers and the chassis frame at the junction of the springs and chassis frame.

4. In a spring suspension for vehicles, a body frame for receiving and sustaining a vehicle body, side bars, constituting a chassis frame, on opposite sides of the body frame and spaced therefrom, springs secured to the ends of the side bars and projecting therebeyond, axles to which the outer ends of the springs are attached, levers of the first order interposed between the body frame and the chassis frame, connections between the outer ends of the levers and the axles, other connections between the inner ends of the levers and the body frame at points intermediate of the body frame, and fulcrum connections between the levers and the side bars carrying the springs.

5. In a spring suspension for vehicles, a body frame for receiving and sustaining a vehicle body, side bars, constituting a chassis frame, on opposite sides of the body frame and spaced therefrom, springs secured to the ends of the side bars and projecting therebeyond, axles to which the outer ends of the springs are attached, levers of the first order interposed between the body frame and the chassis frame, connections between the outer ends of the levers and the axles, other connections between the inner ends of the levers and the body frame at points intermediate of the body frame, and fulcrum connections between the levers and the side bars carrying the springs, the fulcrum connections between certain of the levers and the body frame having a range of movement lengthwise of the vehicle.

6. In a spring suspension for vehicles, a body frame receiving and sustaining a vehicle body, a chassis for carrying the vehicle axles and provided with springs between the axles and chassis, levers connecting the vehicle body frame and the chassis, and pivot connections between the levers and the body frame with said connections comprising threaded studs passed through the body frame and threaded bushings carried by the body frame to receive the studs.

7. In a spring suspension for vehicles, a body frame for receiving and sustaining the vehicle body, a chassis outside of the body frame, means connecting the chassis to the vehicle axle, levers individually connecting the axle and the body frame together, and fulcrum connections between the levers and the chassis, said connections being located at a point between the ends of the levers.

8. In a spring suspension for vehicles, a body frame for receiving and sustaining the vehicle body, a chassis outside of the body frame, resilient means connecting the chassis to the vehicle axle, levers rigidly connected to the axle and pivotally connected to the body frame, and fulcrum connections between the chassis and the levers, said connections being located at a point between the ends of the levers.

9. In a spring suspension for vehicles, a body frame for receiving and sustaining the vehicle body, a chassis outside of the body frame, means connecting the chassis to the vehicle axle, levers rigidly connected at their outer ends to the axle and pivotally connected at their inner ends to the body frame, fulcrum connections between the chassis and intermediate points of the levers, the pivotal connections between the levers and the body frame consisting of a stud on the body frame and a slot in the lever receiving the stud, said levers being longitudinally slitted and the slit extending from the inner end of each lever beyond the fulcrum connection of the lever to the chassis.

In testimony that I claim the foregoing as my own, I have hereto affixed my signature.

JOHN LJUNG.